(12) United States Patent
Chen et al.

(10) Patent No.: US 11,178,134 B2
(45) Date of Patent: Nov. 16, 2021

(54) METHOD AND APPARATUS FOR ALLOCATING DEVICE IDENTIFIERS

(71) Applicant: Alibaba Group Holding Limited, Grand Cayman (KY)

(72) Inventors: Chen Chen, Zhejiang (CN); Haibing Chen, Zhejiang (CN)

(73) Assignee: Alibaba Group Holding Limited, George Town (KY)

( * ) Notice: Subject to any disclaimer, the term of this patent is extended or adjusted under 35 U.S.C. 154(b) by 155 days.

(21) Appl. No.: 16/033,128

(22) Filed: Jul. 11, 2018

(65) Prior Publication Data
US 2018/0324170 A1 Nov. 8, 2018

Related U.S. Application Data

(63) Continuation of application No. PCT/CN2017/070148, filed on Jan. 4, 2017.

(30) Foreign Application Priority Data

Jan. 12, 2016 (CN) .......................... 201610018126.0

(51) Int. Cl.
*H04L 29/06* (2006.01)
*G06F 21/33* (2013.01)
(Continued)

(52) U.S. Cl.
CPC ............ *H04L 63/083* (2013.01); *G06F 21/33* (2013.01); *G06F 21/44* (2013.01); *G06F 21/73* (2013.01);
(Continued)

(58) Field of Classification Search
CPC ....... H04L 61/15; H04L 9/0866; H04L 9/083; H04L 63/0876; H04L 61/2007;
(Continued)

(56) References Cited

U.S. PATENT DOCUMENTS 9,178,877 B1* 11/2015 Koneru ............... H04L 63/0853
2003/0051138 A1* 3/2003 Maeda ..................... G06F 21/32
713/168

(Continued)

FOREIGN PATENT DOCUMENTS

CN 102377756 A 3/2012
CN 103581201 A 2/2014
(Continued)

OTHER PUBLICATIONS

Translation of CN Office Action from Corresponding CN Application No. 201610018126.0 dated Aug. 1, 2019, a counterpart foreign application fo U.S. Appl. No. 16/033,128, 18 pages.
(Continued)

*Primary Examiner* — Abu S Sholeman
(74) *Attorney, Agent, or Firm* — Lee & Hayes, P.C.

(57) ABSTRACT

A method and an apparatus for allocating device identifiers is provided. The method includes receiving a first request, the first request comprising terminal device information and a user authentication password; the user authentication password being generated according to a second request sent before the first request; and generating a first device identifier corresponding to the terminal device using the user authentication password. The method and the apparatus can prevent the device identity from being falsified and improve security.

19 Claims, 9 Drawing Sheets

(51) Int. Cl.
*H04L 9/08* (2006.01)
*G06F 21/73* (2013.01)
*G06F 21/44* (2013.01)
*H04L 29/12* (2006.01)
*H04L 9/06* (2006.01)
*H04L 9/32* (2006.01)
*H04W 12/062* (2021.01)
*H04W 12/06* (2021.01)
*H04W 12/122* (2021.01)
*H04W 12/126* (2021.01)
*H04W 4/70* (2018.01)
*H04L 29/08* (2006.01)

(52) U.S. Cl.
CPC ............ *H04L 9/0643* (2013.01); *H04L 9/083* (2013.01); *H04L 9/0866* (2013.01); *H04L 9/0869* (2013.01); *H04L 9/321* (2013.01); *H04L 9/3226* (2013.01); *H04L 61/15* (2013.01); *H04L 61/1588* (2013.01); *H04L 61/2007* (2013.01); *H04L 63/0876* (2013.01); *H04W 12/062* (2021.01); *H04W 12/068* (2021.01); *H04W 12/122* (2021.01); *H04W 12/126* (2021.01); *H04L 61/6022* (2013.01); *H04L 67/12* (2013.01); *H04L 2209/80* (2013.01); *H04W 4/70* (2018.02)

(58) Field of Classification Search
CPC ............... H04L 61/1588; H04L 9/3226; H04L 2209/80; H04L 67/12; H04L 61/6022; G06F 21/44; G06F 21/73; G06F 21/33; H04W 4/70; H04W 8/26; H04M 1/72522; G06Q 20/12; G06Q 20/34; G06Q 20/401
See application file for complete search history.

(56) References Cited

U.S. PATENT DOCUMENTS

| | | | | |
|---|---|---|---|---|
| 2006/0242241 | A1* | 10/2006 | Tock | H04L 63/083 709/206 |
| 2008/0183487 | A1 | 7/2008 | Wachi | |
| 2011/0066607 | A1* | 3/2011 | Wong | G06F 16/9038 707/706 |
| 2012/0185928 | A1* | 7/2012 | Suzuki | H04N 7/17318 726/9 |
| 2013/0145449 | A1* | 6/2013 | Busser | H04L 63/0838 726/7 |
| 2013/0239172 | A1* | 9/2013 | Murakami | G06F 21/42 726/1 |
| 2015/0106882 | A1 | 4/2015 | Li et al. | |
| 2015/0142667 | A1* | 5/2015 | Landrok | G06Q 20/3823 705/67 |
| 2015/0213238 | A1* | 7/2015 | Farha | G06F 21/10 726/30 |
| 2015/0350186 | A1* | 12/2015 | Chan | H04L 63/0807 726/9 |
| 2016/0088151 | A1* | 3/2016 | Dai | H04M 3/42374 455/414.1 |
| 2016/0112340 | A1* | 4/2016 | Zhong | H04L 47/70 709/226 |
| 2016/0191526 | A1* | 6/2016 | Panchapakesan | H04L 63/10 726/1 |
| 2016/0285875 | A1* | 9/2016 | Lenz | H04L 63/10 |
| 2016/0321628 | A1* | 11/2016 | Xu | G06Q 20/34 |
| 2017/0238273 | A1* | 8/2017 | Yang | H04W 4/70 455/435.1 |
| 2018/0324170 | A1* | 11/2018 | Chen | H04W 12/068 |

FOREIGN PATENT DOCUMENTS

| | | |
|---|---|---|
| CN | 104169952 | 11/2014 |
| CN | 104737176 | 6/2015 |
| CN | 104796265 A | 7/2015 |
| CN | 105141628 A | 12/2015 |
| CN | 105162785 A | 12/2015 |

OTHER PUBLICATIONS

Translation of CN Search Report from Corresponding CN Application No. 201610018126.0 dated Aug. 1, 2019, a counterpart foreign application fo U.S. Appl. No. 16/033,128, 3 pages.

Translation of International Search Report for corresponding PCT Application No. PCT/CN2017/070148, dated Apr. 10, 2017, 2 pages.

Translation of Written Opinion from corresponding PCT Application No. PCT/CN2017/070148, dated Apr. 11, 2017, 5 pages.

English translation of the Chinese Second Office Action dated Mar. 2, 2020, for Chinese Patent Application No. 201610018126.0, a counterpart foreing application to U.S. Appl. No. 16/033,128, 28 pages.

Englsh translation of the Chinese Third Office Action dated Aug. 26, 2020, for Chinese Patent Application No. 201610018126.0, a counterpart foreing application to U.S. Appl. No. 16/033,128, 4 pages.

Translation of CN Search Report from Corresponding CN Application No. 201610018126.0 dated Feb. 1, 2021, a counterpart foreign application fo U.S. Appl. No. 16/033,128, 1 page.

* cited by examiner

# METHOD AND APPARATUS FOR ALLOCATING DEVICE IDENTIFIERS

The present application claims priority to and is a continuation of PCT Patent Application No. PCT/CN2017/070148, filed on Jan. 4, 2017, which claims priority to Chinese Application No. 2016/10018126.0, filed on Jan. 12, 2016 and entitled "METHOD AND APPARATUS FOR ALLOCATING DEVICE IDENTIFIERS," which are incorporated herein by reference in their entirety.

TECHNICAL FIELD

The present invention relates to the field of computer application technology and, in particular, to methods and apparatuses for allocating device identifiers.

BACKGROUND

The rapid development of computer technology brought more convenience to users' lives. A user can use an APP (application software) on a user device to perform data interaction through a cloud with a terminal device bound with the user. For example, in the Internet of Things (IoT), after a mobile phone APP is bound to an IoT device, the user can perform data interaction with the IoT device through the cloud to obtain private data acquired by the IoT device. Ideally, the data acquired by the IoT device is only sent via the IoT to the user bound to the IoT device. As shown in FIG. 1, the data acquired by an IoT device A is sent to a user of the IoT device A, and the data acquired by an IoT device B is sent to a user of the IoT device B.

To achieve the above objective, a server of the IoT cloud first registers the IoT device(s) and the user(s) to generate globally-unique device ID(s) and user ID(s), respectively, in the IoT, and then establishes a binding relation between a device ID and a user ID at the request of the user. The process is roughly as shown in FIG. 2. The user first registers through a mobile phone APP and acquires a user ID. The IoT device sends a registration request to a server in the IoT cloud (201). The server allocates a device ID to the IoT device (202). The user queries or scans the device using the mobile phone APP (203) and acquires the device ID of the IoT device (204). The user sends a binding request to the server, requesting to be bound to the device ID (205). The server locally stores the binding relation between the device ID and the user ID and returns a binding success response to the user (206). This completes the binding. If the IoT device sends the acquired data to the server (207), the server forwards the data to the user according to the binding relation (208).

At present, the user identity registration process, such as short message verification, email verification, and even real name registration audit, is a relatively mature technical solution. User identity registration is relatively secure and reliable. However, the existing device identity registration process is to provide original physical information of an IoT device, such as a device model, a device MAC address and a product serial number, and then to generate a device ID by a server in the IoT cloud through a certain algorithm. However, this solution has obvious security vulnerabilities: because the device ID comes from the original physical information of the IoT device, once the original physical information is falsified, a cloned device and ensuing data attacks can appear. For example, the cloned device falsifies the original physical information of the IoT device and registers it to obtain a real device ID, and sends false information to the user bound with the device ID using the device ID.

SUMMARY OF THE INVENTION

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above, the present invention provides methods and apparatuses for allocating device identifiers so as to prevent a device identity from being falsified and improve security.

The specific technical solutions are as follows:

The present invention provides a method for allocating device identifiers, including: receiving a first request, the first request including terminal device information and a user authentication password; the user authentication password being generated according to a second request sent before the first request; and generating a first device identifier corresponding to the terminal device using the user authentication password.

According to an embodiment of the present invention, the first request is sent by the terminal device or a user terminal; and the second request is sent by the terminal device or the user terminal.

According to an embodiment of the present invention, the method further includes: sending the first device identifier to the terminal device and/or the user terminal.

According to an embodiment of the present invention, the method further includes:

saving a binding relation between user's identity information and the first device identifier.

According to an embodiment of the present invention, the user authentication password is generated by the following method:

receiving the second request;

determining user's identity information, and generating a user authentication password using the user's identity information; and saving the user authentication password corresponding to the user's identity information.

According to an embodiment of the present invention, generating a user authentication password using the user's identity information includes:

after splicing the user's identity information and random information in a preset sequence, encrypting the spliced information to obtain a user authentication password.

According to an embodiment of the present invention, if the received first request does not include a user authentication password, the method further includes:

generating a second device identifier using the terminal device information included in the received first request.

According to an embodiment of the present invention, the method further includes:

returning the generated second device identifier to the terminal device and/or user terminal.

According to an embodiment of the present invention, the terminal device information includes at least one of a device model, a device MAC address, and a product serial number of the device.

According to an embodiment of the present invention, generating a first device identifier using the user authentication password includes:

processing the user authentication password using a Secure Hash Algorithm to obtain the first device identifier; or after splicing the terminal device information and the user authentication password in a preset sequence, processing the spliced information using a Secure Hash Algorithm to obtain the first device identifier.

According to an embodiment of the present invention, the method further includes:

receiving a cancelation request carrying the first device identifier; and releasing the first device identifier.

According to an embodiment of the present invention, the method further includes:

receiving a cancelation request carrying the first device identifier; and deleting the binding relation between the user's identity information and the first device identifier.

According to an embodiment of the present invention, before generating a first device identifier corresponding to the terminal device using the user authentication password, the method further includes:

judging whether the user authentication password included in the first request exceeds a validity period, and if so, returning a registration failure response; otherwise, performing the step of generating a first device identifier corresponding to the terminal device using the user authentication password.

According to an embodiment of the present invention, the method further includes: receiving a login request;

judging whether the first device identifier included in the login request is released, and if so, the login fails; otherwise, the login succeeds.

According to an embodiment of the present invention, the method further includes: receiving a data request including a first device identifier, judging whether, locally, there is user's identity information having a binding relation with the first device identifier, and if so, forwarding the data request to the user terminal corresponding to the user's identity information, otherwise, rejecting the data request; or, receiving a data request including user's identity information, judging whether, locally, there is a first device identifier having a binding relation with the user's identity information, and if so, forwarding the data request to the terminal device corresponding to the first device identifier, otherwise, rejecting the data request.

According to an embodiment of the present invention, the first request is an identity registration request; and the second request is a request for acquiring an authentication password.

The present invention also provides a method for allocating device identifiers, including:

acquiring a user authentication password from a server; and sending the user authentication password to a terminal device to trigger the terminal device to acquire a first device identifier corresponding to the terminal device from the server by using the user authentication password.

According to an embodiment of the present invention, the method further includes:

receiving the first device identifier returned by the terminal device.

According to an embodiment of the present invention, acquiring a user authentication password from a server includes:

sending a request for acquiring an authentication password to the server; and receiving a user authentication password generated by the server using the user's identity information and returned by the server.

According to an embodiment of the present invention, sending the user authentication password to a terminal device includes:

sending the user authentication password to a terminal device using a local area network or a near field communication mode.

According to an embodiment of the present invention, the method further includes:

sending a cancelation request carrying the first device identifier to the server.

According to an embodiment of the present invention, the method further includes:

sending a data request including the first device identifier to the server.

The present invention also provides a method for allocating device identifiers, including:

receiving a user authentication password from a user terminal;

sending a first request including terminal device information and the user authentication password to a server; and receiving and saving the first device identifier returned by the server.

According to an embodiment of the present invention, the method further includes:

returning the first device identifier to the user terminal.

According to an embodiment of the present invention, the method further includes:

sending a login request including the first device identifier to the server;

sending a first request including terminal device information to the server if the login fails; and replacing the locally-saved first device identifier with a received second device identifier.

According to an embodiment of the present invention, receiving a user authentication password from a user terminal includes:

receiving a user authentication password from a user terminal through a local area network or a near field communication mode.

According to an embodiment of the present invention, the method further includes: sending a data request to the server, the data request including a locally-saved device identifier, and the device identifier including a first device identifier or a second device identifier.

The present invention also provides an apparatus for allocating device identifiers, the apparatus disposed at a server, the apparatus including:

a second interaction unit configured to receive a first request, the first request including terminal device information and a user authentication password; the user authentication password generated according to a second request sent before the first request; and an identifier maintenance unit configured to generate a first device identifier using the user authentication password.

According to an embodiment of the present invention, the first request is sent by the terminal device or a user terminal; and the second request is sent by the terminal device or the user terminal.

According to an embodiment of the present invention, the apparatus further includes: a first interaction unit configured to send the first device identifier to the user terminal; and/or, the first interaction unit configured to send the first device identifier to the terminal device.

According to an embodiment of the present invention, the apparatus further includes:

a binding processing unit configured to save a binding relation between user's identity information and the first device identifier.

According to an embodiment of the present invention, the first interaction unit and the password maintenance unit are disclosed;

the first interaction unit is configured to receive the second request; and the password maintenance unit is configured to determine identity information of a user who sends the second request, generate a user authentication password using the user's identity information, and save the user authentication password corresponding to the user's identity information.

According to an embodiment of the present invention, when the password maintenance unit generates a user authentication password using the user's identity information, it executes:

after splicing the user's identity information and random information in a preset sequence, encrypting the spliced information to obtain a user authentication password.

According to an embodiment of the present invention, the identifier maintenance unit is further configured to generate a second device identifier using the terminal device information included in the first request when the first request does not include a user authentication password.

According to an embodiment of the present invention, the apparatus further includes: a first interaction unit configured to return the second device identifier to the user terminal; and/or, the second interaction unit, further configured to return the second device identifier to the terminal device.

According to an embodiment of the present invention, the terminal device information includes at least one of a device model, a device MAC address and a product serial number of the device.

According to an embodiment of the present invention, the identifier maintenance unit is configured to:

process the user authentication password using a Secure Hash Algorithm to obtain a first device identifier; or after splicing the terminal device information and the user authentication password in a preset sequence, process the spliced information using a Secure Hash Algorithm to obtain a first device identifier.

According to an embodiment of the present invention, the apparatus further includes: a first interaction unit configured to receive a cancelation request carrying the first device identifier; and the identifier maintenance unit is further configured to release the first device identifier according to the cancelation request.

According to an embodiment of the present invention, the apparatus further includes: a first interaction unit configured to receive a cancelation request carrying the first device identifier; and the binding processing unit is further configured to delete the binding relation between the user's identity information and the first device identifier according to the cancelation request.

According to an embodiment of the present invention, the apparatus further includes: a password verification unit configured to judge whether the user authentication password included in the first request exceeds a validity period after the second interaction unit receives the first request, and if so, trigger the second interaction unit to return a registration failure response, otherwise, trigger the identifier maintenance unit to generate a first device identifier corresponding to the terminal device using the user authentication password.

According to an embodiment of the present invention, the apparatus further includes a login processing unit;

the second interaction unit is further configured to receive a login request of the terminal device;

the login processing unit is configured to judge whether the first device identifier included in the login request is released, and if so, the login fails; otherwise, the login succeeds.

According to an embodiment of the present invention, the apparatus further includes: a forwarding processing unit configured to, when the second interaction unit receives a data request including the first device identifier sent by the terminal device, judge whether, locally, there is user's identity information having a binding relation with the first device identifier, and if so, forward the data request to the user terminal corresponding to the user's identity information, otherwise, reject the data request; or, when the first interaction unit receives a data request including user's identity information, judge whether, locally, there is a first device identifier having a binding relation with the user's identity information, and if so, forward the data request to the terminal device corresponding to the first device identifier through the second interaction unit, otherwise, reject the data request.

According to an embodiment of the present invention, the first request is an identity registration request; and the second request is a request for acquiring an authentication password.

The invention provides an apparatus for allocating device identifiers, the apparatus disposed at a user terminal, the apparatus including:

a server interaction unit configured to acquire a user authentication password from a server; and a terminal interaction unit configured to send the user authentication password to a terminal device to trigger the terminal device to acquire a first device identifier corresponding to the terminal device from the server by using the user authentication password.

According to an embodiment of the present invention, the terminal interaction unit is further configured to receive the first device identifier returned by the terminal device.

According to an embodiment of the present invention, the server interaction unit is configured to send a request for acquiring an authentication password to the server, and receive a user authentication password generated by the server using the user's identity information and returned by it.

According to an embodiment of the present invention, the terminal interaction unit is configured to send the user authentication password to a terminal device using a local area network or a near field communication mode.

According to an embodiment of the present invention, the server interaction unit is further configured to send a cancelation request carrying the first device identifier to the server.

According to an embodiment of the present invention, the server interaction unit is further configured to send a data request including the first device identifier to the server.

The present invention also provides an apparatus for allocating device identifiers, the apparatus disposed at a terminal device, the apparatus including:

a user interaction unit configured to receive a user authentication password from a user terminal;

a server interaction unit configured to send a first request including terminal device information and the user authentication password to a server, and receive a first device identifier returned by the server; and an identifier saving unit configured to save the first device identifier received by the server interaction unit.

According to an embodiment of the present invention, the user interaction unit is further configured to return the first device identifier to the user terminal.

According to an embodiment of the present invention, the server interaction unit is further configured to send a login request including the first device identifier to the server; send a first request including terminal device information to the server if the login fails; and receive a second device identifier returned by the server;

the identifier saving unit is further configured to replace the locally-saved first device identifier with the second device identifier.

According to an embodiment of the present invention, the user interaction unit is configured to receive a user authentication password from a user terminal through a local area network or a near field communication mode.

According to an embodiment of the present invention, the server interaction unit is further configured to send a data request to the server, the data request including a device identifier saved by the identifier saving unit, and the device identifier including a first device identifier or a second device identifier.

It can be seen from the above technical solutions that, in the present invention, the server generates a first device identifier corresponding to a terminal device according to a user authentication password, but does not simply generate the first device identifier according to the terminal device information. In this way, even if the terminal device is cloned, since the user authentication password cannot be obtained, the identity of the terminal device cannot be falsified and security is improved.

DETAILED DESCRIPTION OF THE EMBODIMENTS

In order to make the objectives, technical solutions and advantages of the present invention clearer, the following describes the present invention in detail in combination with the accompanying drawings and specific embodiments.

First, it should be noted that the method and apparatus provided by the present invention are not limited to identity authentication of an IoT device in an IoT. The present invention is applicable to any terminal device that communicates with a user terminal through a server. The user terminal herein may include, but is not limited to, a smart user device capable of running an APP, such as a mobile phone, a tablet computer, a notebook computer, a PDA (Personal Digital Assistant), etc. The terminal device that communicates with the user terminal may include but is not limited to a smart home device, a network device, a wearable device, a smart medical device, a PC (personal computer), etc. The smart mobile device may include a mobile phone, a tablet computer, a notebook computer, a PDA (personal digital assistant), etc. The smart home device may include a smart television, a smart air conditioner, a smart water heater, a smart refrigerator, a smart air purifier, etc. The network device may include a switch, a wireless AP, a server, etc. The wearable device may include a smart watch, smart glasses, a smart bracelet, etc. The smart medical device may include a smart thermometer, a smart blood pressure meter, a smart blood glucose meter, etc. For convenience, the present invention is described using a mobile phone and an IoT device as an example.

Figure 1:
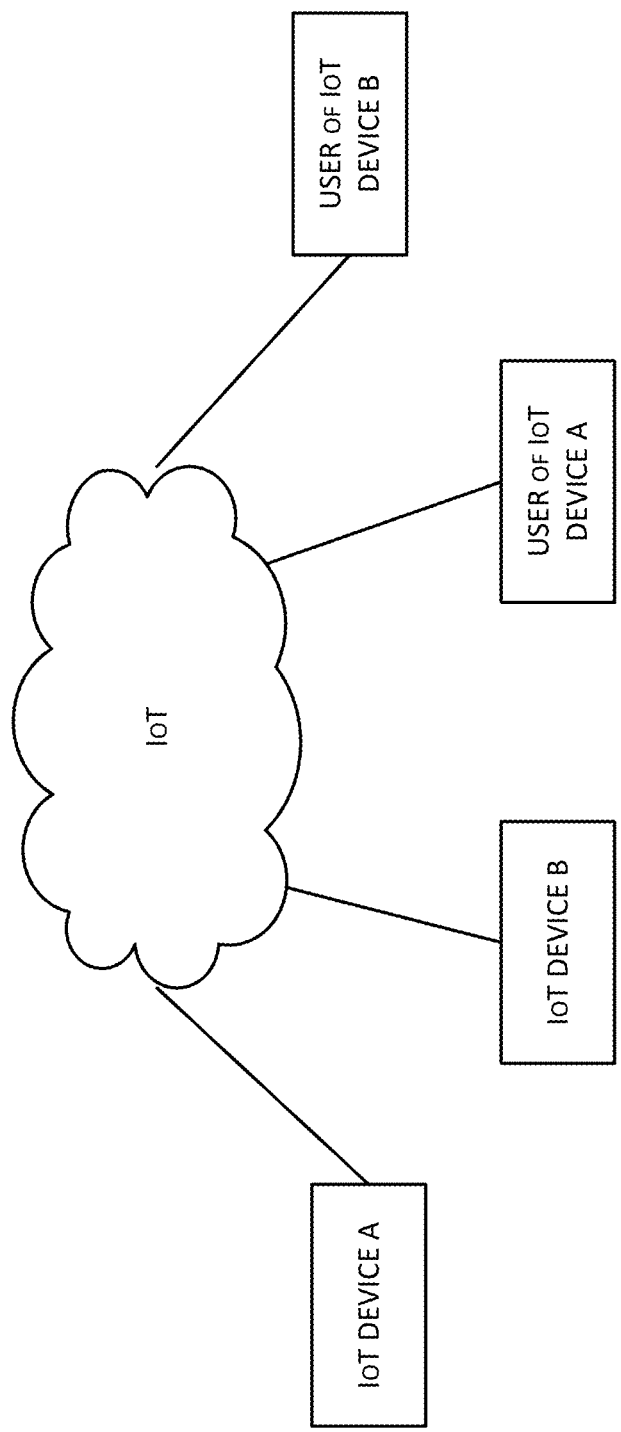
FIG. 1 is a schematic diagram of exemplary data interaction among IoT devices and users in an IoT.
Figure 2:
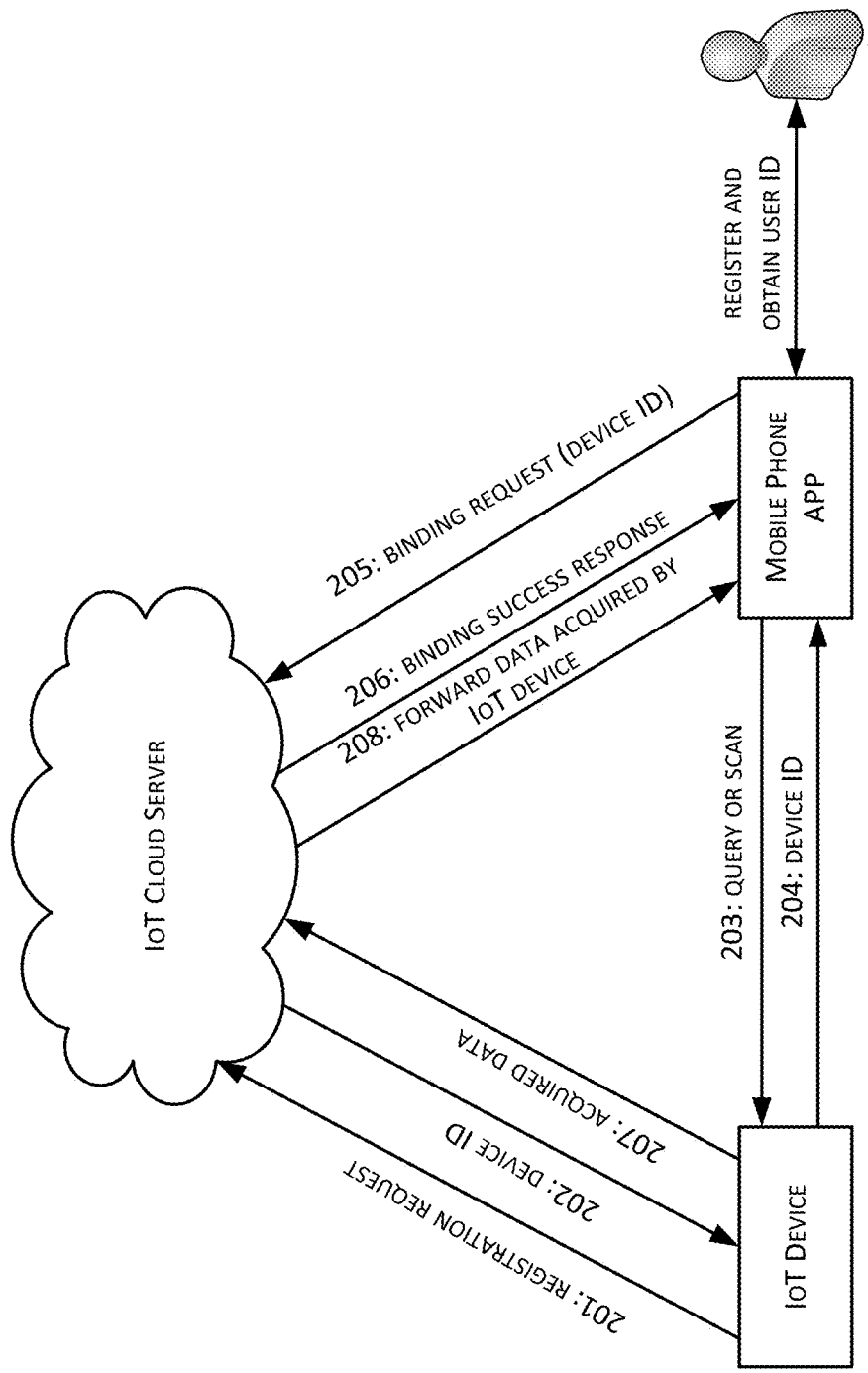
FIG. 2 is a schematic diagram of an exemplary binding process between an IoT device and a user.
Figure 3:
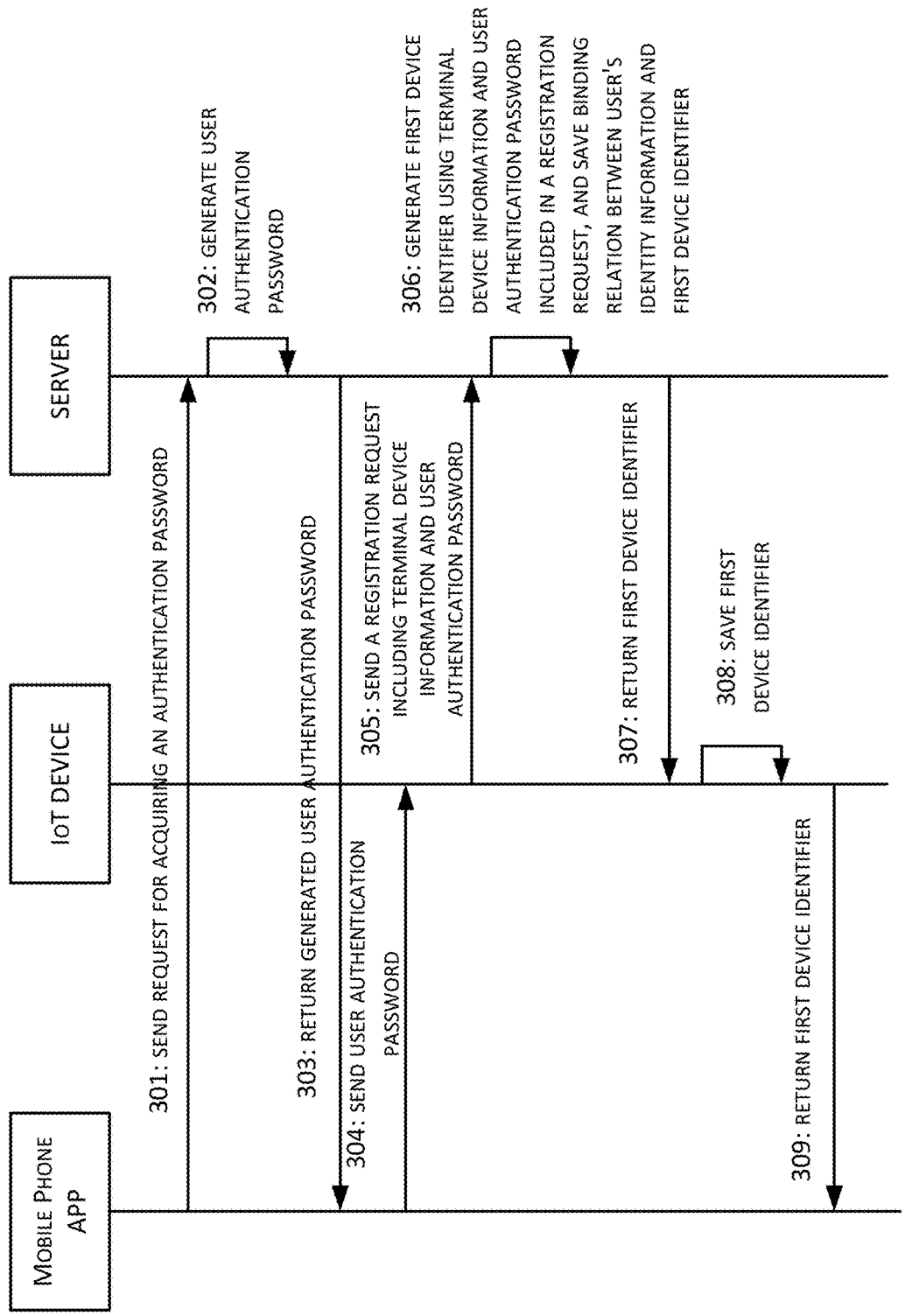
FIG. 3 is a flow diagram of an exemplary method of identity registration according to an embodiment of the present invention.

FIG. 3 is a flow diagram of an exemplary method of identity registration according to an embodiment of the present invention. As shown in FIG. 3, the method may include the following steps:

301, a user sends a request for acquiring an authentication password to a server through a mobile phone APP.

In an embodiment of the present invention, identity registration and binding of an IoT device are triggered by a user terminal. When the user wants to implement binding with an IoT device through a mobile phone, the user logs into the mobile phone APP and sends a request for acquiring an authentication password to the server through the mobile phone APP, wherein the request includes user's identity information. The user's identity information may be user's login account, or user ID allocated to the user by the server, or user ID acquired when the user registers in the server, etc.

302, the server generates a user authentication password using user's identity information.

If the request for acquiring an authentication password includes user's login account, a corresponding User ID may be determined using the user's login account, and then a user authentication password is generated using the User ID. If the request for acquiring an authentication password includes User ID, a user authentication password may be generated directly using the User ID. Of course, a user authentication password may also be generated using other user's identity information such as user identity ID. In this embodiment, the user authentication password is generated only using the User ID as an example.

The process of generating a user authentication password may include: after splicing the User ID and random information in sequence, encrypting the obtained information to obtain a user authentication password. For example, after a one time splicing of the User ID, current time, and a three-digit decimal number randomly generated by the server is performed, an MD5 value is calculated from the spliced character string, and the obtained value is used as a user authentication password.

The user authentication password generated in the above manner has the following characteristics: 1) traceability, i.e., user's identity information can be traced from the user authentication password; 2) randomness, i.e., the server generates respective different user authentication passwords for multiple authentication requests of the same user; and 3) uniqueness, i.e., any user authentication password is unique at the server and cannot be repeated.

After the user authentication password is generated, the corresponding relation between the user's identity information and the user authentication password is stored locally. In addition, each user authentication password may have a validity period, and when the validity period expires, the user authentication password is invalidated. The form of the user authentication password stored at the server may be as shown in Table 1.

TABLE 1

| User ID | User Authentication Password | Valid or Not | Password Generation Time | Password Termination Time |
| --- | --- | --- | --- | --- |
| 1111111 | a95bf5213cdcd1eb 600687e380860f74 | Yes | 2015 Dec. 12 11:15 | 2015 Dec. 12 11:20 |

Once the user authentication password is used, i.e., a device identifier is generated using the user authentication password and transmitted later, the user authentication password is invalidated. In addition, the user authentication password exceeding the validity period is also set to be invalid.

303, the server returns the generated user authentication password to the user's mobile phone APP.

304, the mobile phone APP sends the user authentication password to an IoT device.

After acquiring the user authentication password, the user can provide the user authentication password to the IoT device to be bound through the mobile phone APP. In this step, if the mobile phone and the IoT device are in the same local area network, the mobile phone APP can send the user authentication password to the IoT device through the local area network. Alternatively, the user authentication password may also be sent to the IoT device through a short field communication mode, for example, through Bluetooth, infrared transmission, NFC (Near Field Communication), etc.

305, the IoT device sends a registration request including the terminal device information and the user authentication password to the server.

The terminal device information may include but is not limited to at least one of a device model, a device MAC address, and a device SN (Serial Number).

306, the server generates a first device identifier using the terminal device information and the user authentication password included in the registration request, and saves a binding relation between the user's identity information and the first device identifier.

The algorithm used for generating the first device identifier needs to ensure that the generated first device identifier is unique. A Secure Hash Algorithm (SHA) may be adopted in the embodiment of the present invention. For example, the device model, the device MAC address, and the device SN may be spliced in a preset sequence, and then the spliced information is processed using an SHA-256 algorithm to obtain a first device identifier.

In addition to the method of generating the first device identifier using the terminal device information and the user authentication password provided in this step, a method of generating the first device identifier using only the user authentication password may also be adopted, for example, the user authentication password is processed using an SHA-256 algorithm to obtain a first device identifier. It is even possible to directly use the user authentication password as the first device identifier. Then, the server stores the corresponding relation between the terminal device information and the user authentication password.

In addition, in this step, the server may first verify the user authentication password included in the received registration request, that is, verifying whether the user authentication password is saved locally and the user authentication password is valid, if so, the verification passes, and a first device identifier is generated. Otherwise, the verification fails. A registration failure response may be returned to the IoT device.

When the binding relation is saved, the corresponding relation between the User ID and the first device identifier may be saved, so as to implement binding between the user and the IoT device.

307, the server returns the first device identifier to the IoT device.

In this step, the first device identifier may be carried in a registration success response and returned to the IoT device.

308, the IoT device saves the first device identifier locally.

In the embodiment of the present invention, one IoT device may be allowed to be bound with only one user or with multiple users. When being bound with multiple users, the IoT device has a plurality of first device identifiers, and the server stores binding relations between the plurality of first device identifiers and the different users. However, considering the data privacy of the IoT device, the former is preferred, that is, one IoT device is allowed to be bound with only one user.

If one IoT device is allowed to be bound with only one user, the IoT device may replace the locally-saved device identifier with the received first device identifier. That is, one IoT device can have only one device identifier at the same time.

309, the IoT device returns the first device identifier to the mobile phone APP.

The identity registration of the IoT device and the binding between the user and the IoT device can be completed through the process shown in FIG. 3.

For the data request sent from the IoT device to the user terminal, the server judges whether, locally, there is a binding relation with the first device identifier included in the data request, and if not, the server can reject the data request. If so, the server forwards the data request to the user having the binding relation with the first device identifier.

For the data request sent from the user terminal to the IoT device, the server judges whether there is a first device identifier having a binding relation with the user's identifier, if so, the server forwards the data request to the IoT device corresponding to the first device identifier, otherwise, the server rejects the data request.

It can be seen from this embodiment that, once the IoT device is authenticated by the user, a new first device identifier needs to be used by updating, and the binding relation between the IoT device and the user terminal is hidden in the first device identifier. When the IoT device is authenticated by a certain user, the data of the IoT device belongs only to the user and accepts the user's access control.

It should be noted that, the above embodiment is described using identity registration implemented by the terminal device as an example. However, the present invention is not limited to the identity registration, and may also be applied to any process that needs device identifier allocation in addition to identity registration, and correspondingly, the above registration request is replaced with other corresponding type of service request.

In addition, the steps in the process shown in FIG. 3 may also be implemented differently, for example, steps 304 and 305 may be replaced with the following: the user terminal acquires terminal device information from the IoT device by scanning a two-dimensional code of the device or other ways, then the mobile phone APP sends the user authentication password and the terminal device information to the server, and the server performs 306 to allocate the first device identifier to the IoT device.

For another example, steps 307 to 309 may also be replaced with the following: the server returns the first device identifier to the mobile phone APP, the mobile phone APP provides the first device identifier to the IoT device, and the IoT device saves the first device identifier. Or, the server returns the first device identifier to the mobile phone APP and the IoT device, and the IoT device saves the first device identifier.

Figure 4:
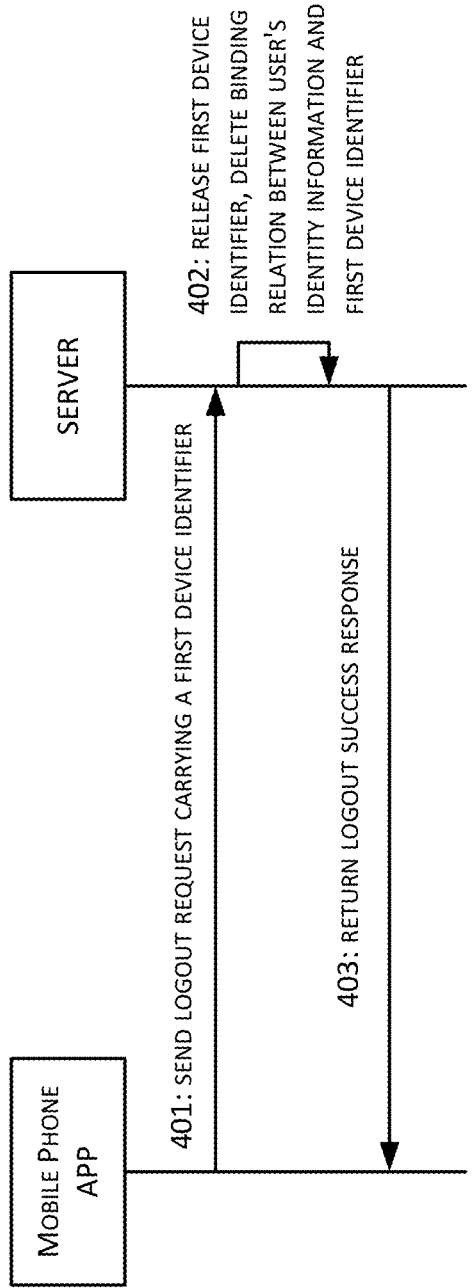
FIG. 4 is a flow diagram of an exemplary method of releasing the authentication of an IoT device according to an embodiment of the present invention.

If the user wants to release the authentication of the IoT device, it can be realized by the process shown in FIG. 4. FIG. 4 is a flow diagram of a method for releasing authentication of an IoT device according to an embodiment of the present invention. As shown in FIG. 4, the method may include the following steps:

401, a user sends a cancelation request to a server through a mobile phone APP, the cancelation request carrying a first device identifier to be released.

402, the server releases the first device identifier according to the first device identifier carried in the cancelation request, and deletes a binding relation between user's identity information and the first device identifier.

Releasing the first device identifier in this step may be setting the first device identifier to be invalid/illegal, or deleting the first device identifier from the server, etc.

403, the server returns a cancelation success response to the mobile phone APP.

After the server releases the first device identifier, subsequent login and data request using the first device identifier will be rejected. For example, after the user terminal releases the identifier of the IoT device from the server, the IoT device sends a login request to the server, the login request including the first device identifier of the IoT device; and the server determines that the first device identifier has been released, then rejects the login of the IoT device, and returns a login failure response to the IoT device.

As another example, after the user terminal releases the first device identifier of the IoT device from the server, the IoT device sends a data request to the server, the data request including the first device identifier of the IoT device; and the server determines that the first device identifier has been released, and then rejects the data request of the IoT device.

Figure 5:
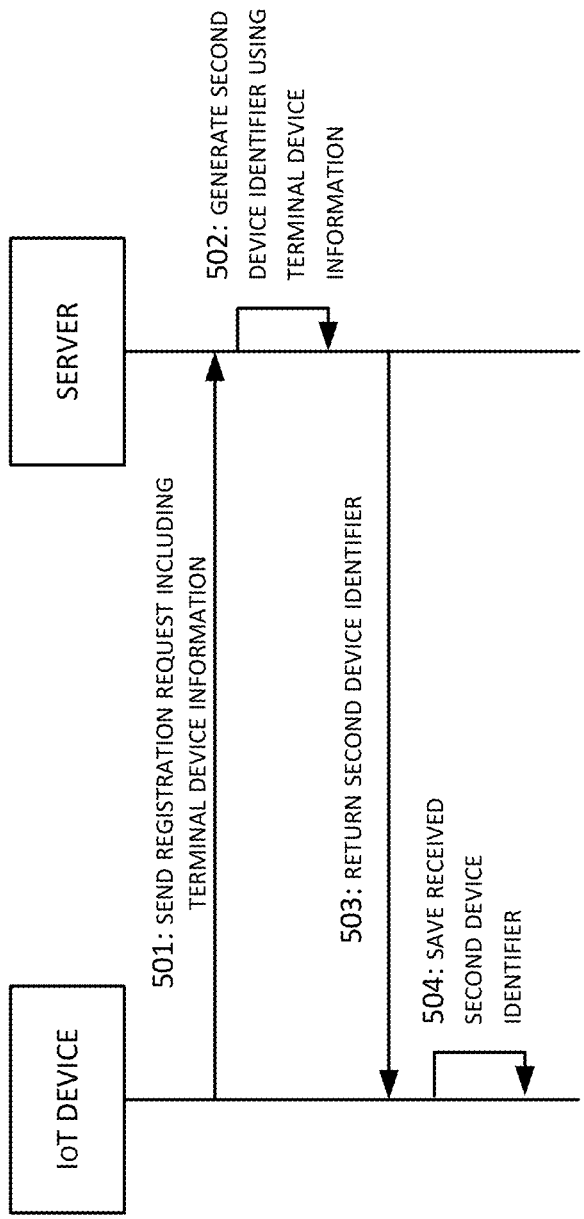
FIG. 5 is a flow diagram of another exemplary method of identity registration according to an embodiment of the present invention.

On the Internet, IoT, and other networks, there will be a variety of devices. Similarly, taking the IoT as an example, there are some network devices, such as a thermometer installed in a public place, and the data acquired by the thermometer is acquired by the server and then stored in a database, but is not bound with a specific user. For another example, a router is usually not bound with a specific user via a server. Such devices may be referred to as "ownerless devices". The identity registration of an ownerless device also depends on the existing registration method, i.e., a second device identifier is generated at a server only according to the terminal device information of a terminal device. The process may be as shown in FIG. 5, including the following steps:

501, an IoT device sends a registration request to a server, the registration request including terminal device information.

The terminal device information may include a device model, a device MAC address, and a device SN.

For an ownerless device, it can actively initiate a registration request. Or, when an ownerless device sends a login request to a server, since there is no device identifier or binding relation of the ownerless device at the server, the server will notify the ownerless device to adopt terminal device information for identity registration while rejecting its login. After receiving the notification, the terminal device actively initiates a registration request including terminal device information. There is also a case, i.e., when an IoT device released from identity authentication sends a login request to the server, the server determines that the first identity authentication identifier of the IoT device has been released, and returns a login failure response. After receiving the login failure response, the IoT device may actively initiate a registration request only including terminal device information.

502, the server generates a second device identifier using the terminal device information.

In this case, the server generates the second device identifier only using original physical information such as a device model, a device MAC address and a device SN. This method is not described in detail herein.

503, the server returns a second device identifier to the IoT device.

504, the IoT device saves the received second device identifier.

If the IoT device is only allowed to have one device identifier at the same time and has a first device identifier stored locally, the locally-stored first device identifier may be updated with the received second device identifier.

For a data request sent by an ownerless device, after the server receives the data request and determines that the data request includes a second device identifier, the server can process the data request according to a preset processing method, for example, send the data carried in the data request to a database.

The above is a detailed description of the method provided by the present invention, and the apparatus provided by the present invention will be described in detail below in combination with embodiments.

Figure 6:
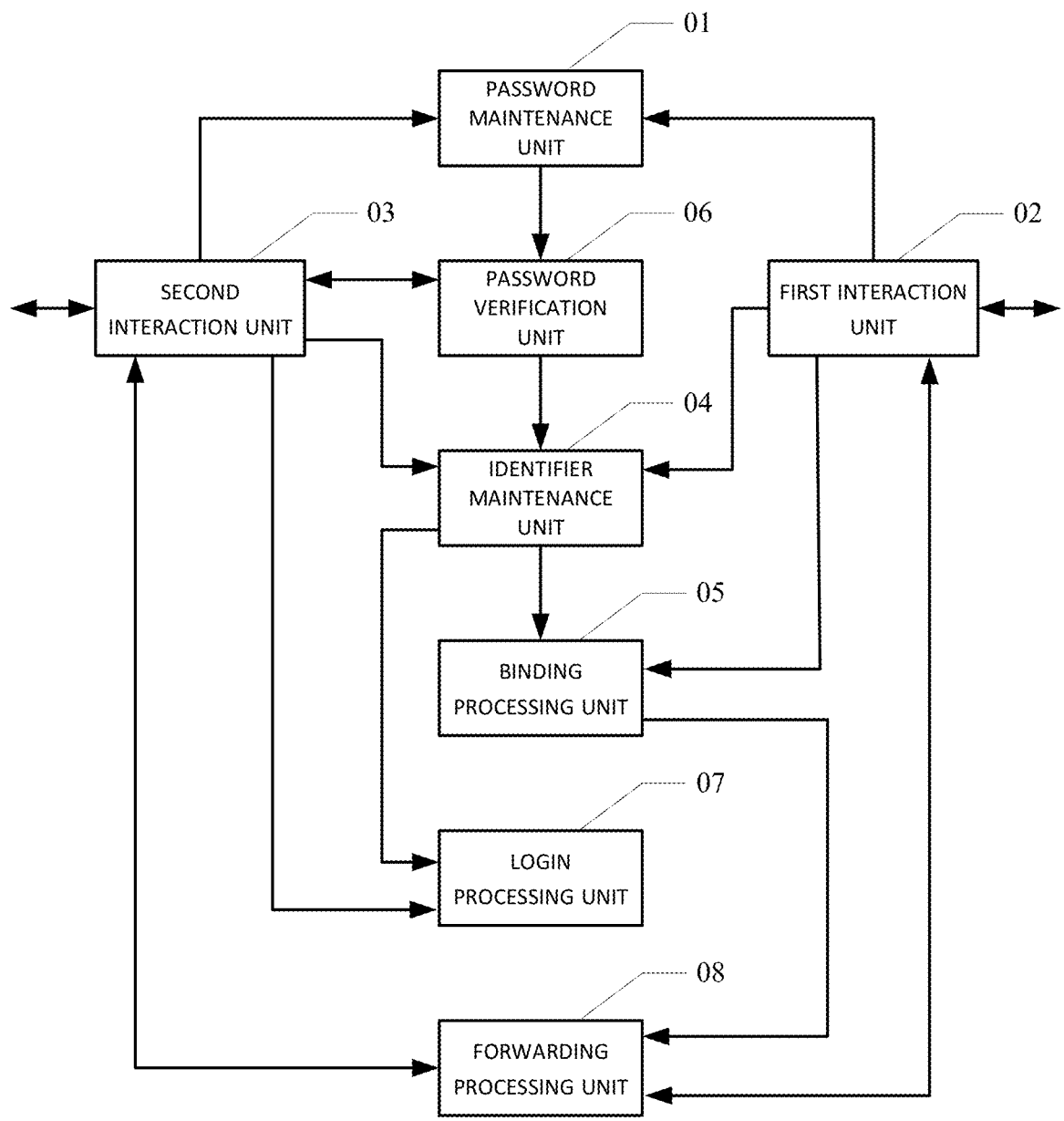
FIG. 6 is a structural diagram of an exemplary apparatus disposed at a server according to an embodiment of the present invention.

FIG. 6 is a structural diagram of an apparatus disposed at a server according to an embodiment of the present invention. As shown in FIG. 6, the apparatus includes a second interaction unit 03 and an identifier maintenance unit 04, and may further include a password maintenance unit 01, a first interaction unit 02, a binding processing unit 05, a password verification unit 06, a login processing unit 07 and a forwarding processing unit 08. The main functions of respective units are as follows:

The second interaction unit 03 is configured to receive a first request, the first request including terminal device information and a user authentication password, and the user authentication password being generated according to a second request sent before the first request.

The first request may be sent by a terminal device or a user terminal; and the second request may be sent by the terminal device or the user terminal.

The first interaction unit 02 may send a first device identifier to the user terminal; and/or, send a first device identifier to the terminal device.

The password maintenance unit 01 is configured to generate a user authentication password for a user. Specifically, the first interaction unit 02 receives the second request from the user terminal; the password maintenance unit 01 then determines identity information of a user who sends the first request, and generates a user authentication password using the user's identity information; and the password maintenance unit 01 saves the user authentication password corresponding to the user's identity information.

When the password maintenance unit 01 generates a user authentication password using the user's identity information, it can splice the user's identity information and random information in a preset sequence, and encrypt the spliced information to obtain a user authentication password.

The first interaction unit 02 is configured to send the generated user authentication password to the user terminal.

After the identifier maintenance unit 04 generates a first device identifier using the user authentication password, the second interaction unit 03 returns the first device identifier generated by the identifier maintenance unit 04 to the terminal device, and the binding processing unit 05 saves a binding relation between the user's identity information and the first device identifier.

The identifier maintenance unit 04 may generate a first device identifier using only the user authentication password, for example, process the user authentication password using a Secure Hash Algorithm to obtain a first device identifier, and may even directly use the user authentication password as the first device identifier.

The identifier maintenance unit 04 may also generate a first device identifier using the terminal device information and the user authentication password. For example, after splicing the terminal device information and the user authentication password in a preset sequence, the identifier maintenance unit 04 processes the spliced information using a Secure Hash Algorithm to obtain a first device identifier.

In addition, the user authentication password may have a certain validity period. After the second interaction unit 03 receives the first request, the password verification unit 06 may judge whether the user authentication password included in the first request exceeds the validity period, and if so, trigger the second interaction unit 03 to return a registration failure response to the terminal device, otherwise, trigger the identifier maintenance unit 04 to implement the above operation of generating a first device identifier using the terminal device information and the user authentication password included in the first request.

If the first request received by the second interaction unit 03 does not include a user authentication password, the identifier maintenance unit 04 may generate a second device identifier using the terminal device information included in the received first request. The second interaction unit 03 returns the second device identifier to the terminal device and/or the user terminal.

The first interaction unit 02 may receive a cancelation request carrying a first device identifier. The identifier maintenance unit 04 releases the first device identifier according to the first device identifier carried in the cancelation request. The binding processing unit 05 deletes the binding relation between the user's identity information and the first device identifier according to the first device identifier carried in the cancelation request.

After the second interaction unit 03 receives a login request of the terminal device, the login processing unit 07 may judge whether the first device identifier included in the login request is released, and if so, the login fails; otherwise, the login succeeds.

The data interaction between the user terminal and the terminal device may be processed by the forwarding processing unit 08. That is, when the second interaction unit 03 receives a data request including a first device identifier sent by the terminal device, the forwarding processing unit 08 judges whether there is a binding relation with the first device identifier included in the data request locally, and if so, forwards the data request through the first interaction unit 02 to the user terminal corresponding to the user identity information having a binding relation with the first device identifier, otherwise, rejects the data request.

When the first interaction unit 02 receives the data request sent by the user, the forwarding processing unit 08 judges whether, locally, there is a first device identifier having a binding relation with the user's identity information, and if so, forwards the data request through the second interaction unit 03 to the terminal device corresponding to the first device identifier, otherwise, rejects the data request.

The above apparatus may be applied in an identity registration process of a terminal device. In this application scenario, the first request is an identity registration request, and the second request is a request for acquiring an authentication password.

Figure 7:
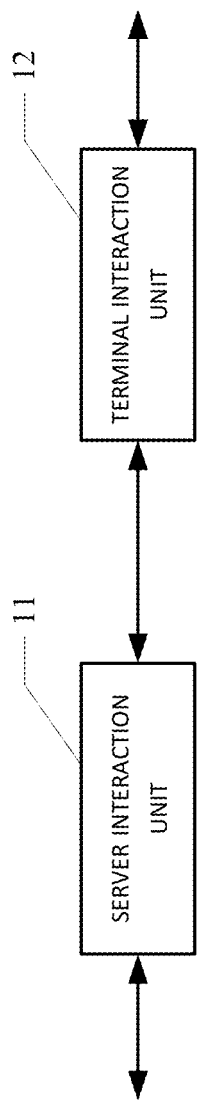
FIG. 7 is a structural diagram of an exemplary apparatus disposed at a user terminal according to an embodiment of the present invention.

FIG. 7 is a structural diagram of an apparatus disposed at a user terminal according to an embodiment of the present invention. As shown in FIG. 7, the apparatus includes a server interaction unit 11 and a terminal interaction unit 12. The main functions of respective units are as follows:

The server interaction unit 11 is configured to acquire a user authentication password from a server. Specifically, the server interaction unit 11 may send a request for acquiring an authentication password to the server, and receive a user authentication password generated by the server using the user's identity information and returned by the server.

The terminal interaction unit 12 is configured to send the user authentication password to a terminal device to trigger the terminal device to acquire a first device identifier corresponding to the terminal device from the server. The terminal interaction unit 12 may further receive the first device identifier returned by the terminal device.

Specifically, the terminal interaction unit 12 may send the user authentication password to the terminal device using a local area network or a near field communication mode. The near field communication method may include but is not limited to Bluetooth, infrared, NFC, etc.

When the user desires to release the authentication and binding relation of a terminal device, the server interaction unit 11 may send a cancelation request to the server, the cancelation request carrying a first device identifier.

In addition, when the user desires to send data to a terminal device bound thereto, the data may be carried in the data request and sent to the server, or when the user desires to acquire the data of the terminal device bound thereto, the information of the requested data may also be carried in the data request and sent to the server. That is, the server interaction unit 11 sends a data request including a first device identifier to the server.

Figure 8:
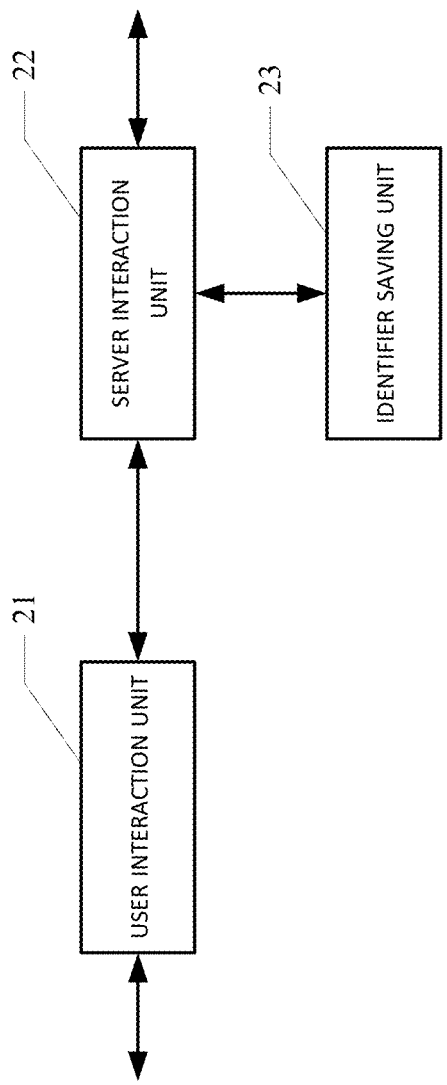
FIG. 8 is a structural diagram of an exemplary apparatus disposed at a terminal device according to an embodiment of the present invention.

FIG. 8 is a structural diagram of an apparatus disposed at a terminal device according to an embodiment of the present invention. As shown in FIG. 8, the apparatus may include a user interaction unit 21, a server interaction unit 22 and an identifier saving unit 23. The main functions of respective units are as follows:

The user interaction unit 21 is configured to receive a user authentication password from a user terminal.

The server interaction unit 22 is configured to send a first request including terminal device information and the user authentication password to a server, and receive a first device identifier returned by the server.

The identifier saving unit 23 is configured to save the first device identifier received by the server interaction unit 22.

The user interaction unit 21 returns the first device identifier received by the server interaction unit 22 to the user terminal.

In addition, the server interaction unit 22 may send a login request including the first device identifier to the server; send a first request including terminal device information to the server if the login fails; and receive a second device identifier returned by the server. The identifier saving unit 23 replaces the locally saved first device identifier with the second device identifier.

The first device identifier is generated by the server using the terminal device information and the user authentication password, and the second device identifier is generated by the server using only the terminal device information.

When the device is applied to identity registration of a terminal device, the first request may be a registration request.

The user interaction unit 21 may receive the user authentication password from the user terminal through a local area network or a near field communication mode. The near field communication method may include but is not limited to Bluetooth, infrared, NFC, etc.

When the server interaction unit 22 subsequently sends a data request to the server, the device identifier saved by the identifier saving unit 23 is carried in the data request.

The above method and apparatus provided by the present invention can be widely applied in the IoT. For example, a user triggers a fire alarm probe disposed at a fixed location through a mobile phone APP and the above method to perform identity registration and is successfully bound with the fire alarm probe. When the fire alarm probe detects abnormal data, it can send a data request including the abnormal data to a server, and the server forwards the abnormal data to the user's mobile phone APP according to the binding relation between the user's identity information saved in the identity registration process and the identifier of the fire alarm probe. It is the mobile phone APP that acquires a user authentication password from the server, then provides the user authentication password to the fire alarm probe and triggers the fire alarm probe to request the server for identity registration. In the identity registration process, the server needs to generate a device identifier using the user authentication password for the fire alarm probe. Thus, even if a cloned device acquires the original physical information of the fire alarm probe, because it cannot acquire the user authentication password, it cannot falsify the identity of the fire alarm probe to generate attack data or false data.

Figure 9:
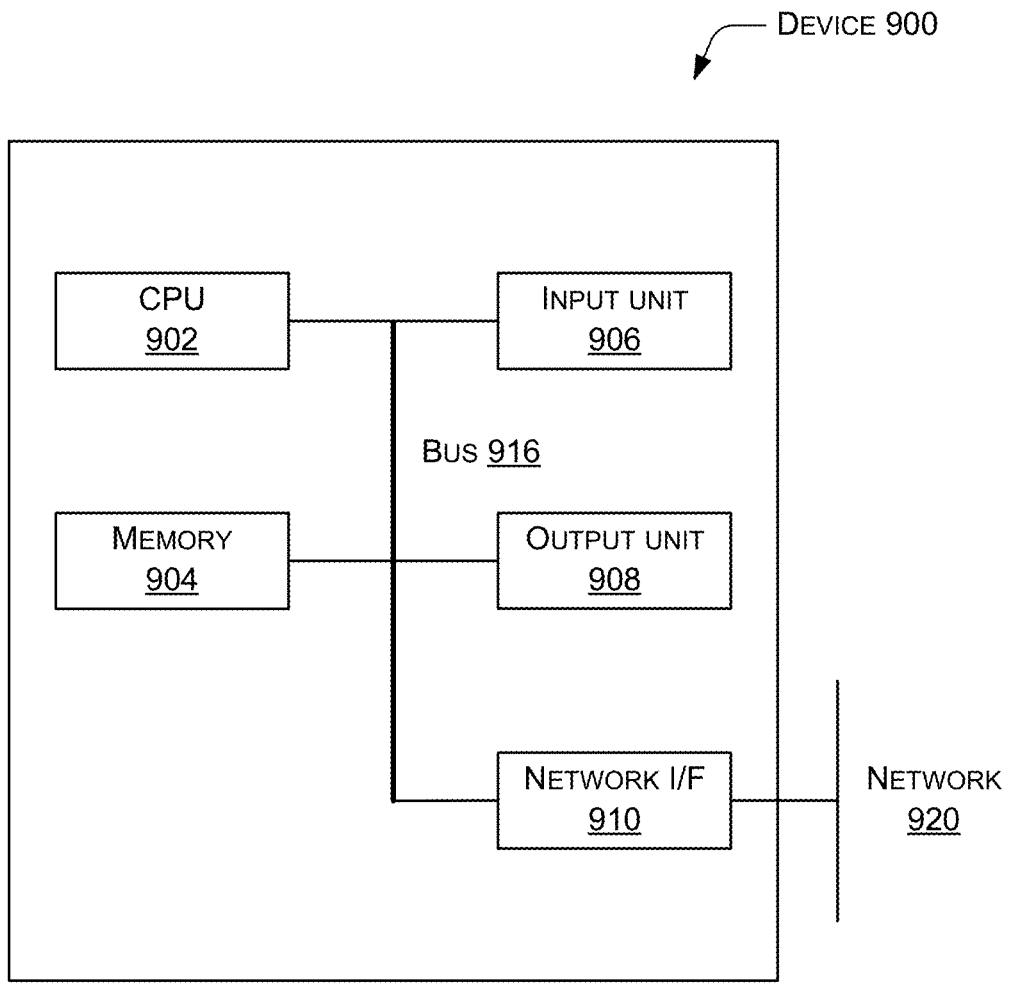
FIG. 9 is a block diagram illustrating an exemplary computer in which embodiments of the invention can be implemented.

FIG. 9 illustrates the exemplary components of a computer 900 which can be any of the IoT devices, servers, terminals, mobile devices described in the embodiments above. The computer 900 can include a central processing unit (CPU) 902, memory 904, an input unit 906, an output unit 908, and a network interface 910, all connected to a bus 916. The network interface 910 allows the computer 900 to connect to a network 920. The memory 904 can store the one or more illustrated modules of FIGS. 6-8 and/or instructions for carrying out the methods disclosed in the embodiments above. The input unit 906 can receive user input or data. The network interface 910 allows computer 910 to communicate with one or more of the other computers on the network.

Any other types of computer readable media can also be used for storing the software product. The software product, when executed by a processor, can perform the methods disclosed in the embodiments above. The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In the several embodiments provided in the present invention, it should be understood that the disclosed apparatus and method may be implemented in other ways. For example, the apparatus embodiments described above are only exemplary, e.g., the division of the units is only a logic function division, and other division modes may be adopted in practice.

The units illustrated as separate components may be or may not be physically separated, and the components displayed as units may be or may not be physical units, that is to say, the components may be positioned at one place or may also be distributed on a plurality of network units. The objectives of the solutions of the embodiments may be fulfilled by selecting part of or all of the units according to actual needs.

In addition, the functional units in the embodiments of the present invention may be integrated into one processing unit, or each of the units may exist alone physically, or two or more units may be integrated into one unit. The integrated unit may be implemented in the form of hardware or in the form of hardware and functional units of software.

The integrated unit implemented in the form of functional units of software may be stored in a non-transitory computer readable storage medium. The functional units of software are stored in a storage medium, which includes a plurality of instructions enabling computer equipment (which may be a personal computer, a server, or network equipment and the like) or a processor to execute part of the steps in the methods of the embodiments of the present invention. The aforementioned storage medium includes: various media capable of storing program codes, such as a USB drive, a portable hard drive, a read-only memory (ROM), a random access memory (RAM), a magnetic disk or optical disk, etc.

In one aspect of the invention, a method of allocating device identifiers is disclosed. In an embodiment, the method includes: acquiring a user authentication password from a server; and sending the user authentication password to a terminal device to trigger the terminal device to acquire a first device identifier corresponding to the terminal device from the server by using the user authentication password.

In an embodiment, sending the user authentication password to a terminal device includes: sending the user authentication password to a terminal device using a local area network or a near field communication mode.

In an embodiment, the method further includes: sending a cancelation request carrying the first device identifier to the server.

In an embodiment, the method further includes: sending a data request including the first device identifier to the server.

In another aspect of the invention, a method for allocating device identifiers is disclosed. In an embodiment, the method includes: receiving a user authentication password from a user terminal; sending a first request comprising terminal device information and the user authentication password to a server; and receiving and saving the first device identifier returned by the server.

In an embodiment, the method further includes: returning the first device identifier to the user terminal.

In an embodiment, the method further includes: sending a login request comprising the first device identifier to the server; sending a first request comprising terminal device information to the server if the login fails; and replacing the locally-saved first device identifier with a received second device identifier.

In an embodiment, receiving a user authentication password from a user terminal includes: receiving a user authentication password from a user terminal through a local area network or a near field communication mode.

In an embodiment, the method further includes: sending a data request to the server, the data request comprising a locally-saved device identifier, and the device identifier including a first device identifier or a second device identifier.

In another aspect of the invention, an apparatus for allocating device identifiers is disclosed, The apparatus is disposed at a server and includes: a second interaction unit configured to receive a first request, the first request comprising terminal device information and a user authentication password, the user authentication password generated according to a second request sent before the first request; and an identifier maintenance unit configured to generate a first device identifier using the user authentication password.

In an embodiment, the first request is sent by a terminal device or a user terminal; and the second request is sent by the terminal device or the user terminal.

In an embodiment, the apparatus further includes: a first interaction unit configured to send the first device identifier to the user terminal; and/or, the first interaction unit configured to send the first device identifier to the terminal device.

In an embodiment, the apparatus further includes: a binding processing unit configured to save a binding relation between user's identity information and the first device identifier.

In an embodiment, the apparatus further includes: a first interaction unit and a password maintenance unit; the first interaction unit configured to receive the second request; and the password maintenance unit configured to determine identity information of a user who sends the second request, generate a user authentication password using the user's identity information, and save the user authentication password corresponding to the user's identity information.

In an embodiment, when the password maintenance unit generates a user authentication password using the user's identity information, it executes: after splicing the user's identity information and random information in a preset sequence, encrypting the spliced information to obtain a user authentication password.

In an embodiment, the identifier maintenance unit is further configured to generate a second device identifier using the terminal device information included in the first request when the first request does not comprise a user authentication password.

In an embodiment, the apparatus further includes: a first interaction unit configured to send the second device identifier to the user terminal; and/or, the second interaction unit further configured to return the second device identifier to the terminal device.

In an embodiment, the terminal device information includes at least one of a device model, a device MAC address, and a product serial number of the device.

In an embodiment, the identifier maintenance unit is configured to: process the user authentication password using a Secure Hash Algorithm to obtain a first device identifier; or after splicing the terminal device information and the user authentication password in a preset sequence, process the spliced information using a Secure Hash Algorithm to obtain a first device identifier.

In an embodiment, the apparatus further includes: a first interaction unit configured to receive a cancelation request carrying the first device identifier; and the identifier maintenance unit further configured to release the first device identifier according to the cancelation request.

In an embodiment, the apparatus further includes: a first interaction unit configured to receive a cancelation request carrying the first device identifier; and the binding processing unit is further configured to delete the binding relation between the user's identity information and the first device identifier according to the cancelation request.

In an embodiment, the apparatus further includes: a password verification unit configured to judge whether the user authentication password included in the first request exceeds a validity period after the second interaction unit receives the first request, and if so, trigger the second interaction unit to return a registration failure response, otherwise, trigger the identifier maintenance unit to generate a first device identifier corresponding to the terminal device using the user authentication password.

In an embodiment, the apparatus further includes: a login processing unit; the second interaction unit is further configured to receive a login request of the terminal device; and the login processing unit is configured to judge whether the first device identifier included in the login request is released, and if so, the login fails; otherwise, the login succeeds.

In an embodiment, the apparatus further includes: a forwarding processing unit configured to, when the second interaction unit receives a data request comprising the first device identifier sent by the terminal device, judge whether, locally, there is user's identity information having a binding relation with the first device identifier, and if so, forward the data request to the user terminal corresponding to the user's identity information, otherwise, reject the data request; or, when the first interaction unit receives a data request comprising user's identity information, judge whether, locally, there is a first device identifier having a binding relation with the user's identity information, and if so, forward the data request to the terminal device corresponding to the first device identifier through the second interaction unit, otherwise, reject the data request.

In an embodiment, the first request is an identity registration request; and the second request is a request for acquiring an authentication password.

In an embodiment, an apparatus for allocating device identifiers is disclosed, the apparatus disposed at a user terminal and includes: a server interaction unit configured to acquire a user authentication password from a server; and a terminal interaction unit configured to send the user authentication password to a terminal device to trigger the terminal device to acquire a first device identifier corresponding to the terminal device from the server by using the user authentication password.

In an embodiment, the terminal interaction unit is further configured to receive the first device identifier returned by the terminal device.

In an embodiment, the server interaction unit is configured to send a request for acquiring an authentication password to the server, and receive a user authentication password generated by the server using the user's identity information and returned by it.

In an embodiment, the terminal interaction unit is configured to send the user authentication password to a terminal device using a local area network or a near field communication mode.

In an embodiment, the server interaction unit is further configured to send a cancelation request carrying the first device identifier to the server.

In an embodiment, the server interaction unit is further configured to send a data request comprising the first device identifier to the server.

In another aspect of the invention, an apparatus for allocating device identifiers is disclosed. In an embodiment, the apparatus is disposed at a terminal device and includes: a user interaction unit configured to receive a user authentication password from a user terminal; a server interaction unit configured to send a first request comprising terminal device information and the user authentication password to a server, and receive a first device identifier returned by the server; and an identifier saving unit configured to save the first device identifier received by the server interaction unit.

In an embodiment, the user interaction unit is further configured to return the first device identifier to the user terminal.

In an embodiment, the server interaction unit is further configured to send a login request including the first device identifier to the server; send a first request comprising terminal device information to the server if the login fails; and receive a second device identifier returned by the server; and the identifier saving unit is further configured to replace the locally-saved first device identifier with the second device identifier.

In an embodiment, the user interaction unit is configured to receive a user authentication password from a user terminal through a local area network or a near field communication mode.

In an embodiment, the server interaction unit is further configured to send a data request to the server, the data request including a device identifier saved by the identifier saving unit, and the device identifier comprising a first device identifier or a second device identifier.

The foregoing descriptions are merely exemplary embodiments of the present invention, but are not intended to limit the present invention. Any modification, equivalent substitution, improvement or the like made within the spirit and principle of the present invention shall fall within the protection scope of the present invention.

What is claimed is:

1. A method of allocating device identifiers, comprising:
receiving a first request, the first request comprising terminal device information and a user authentication password; the user authentication password matching a locally saved user authentication password, the locally saved user authentication password being generated according to a prior request received before the first request;
generating, at a server, a first device identifier corresponding to a terminal device using the user authentication password;
binding, by the server, a user's identity information and the first device identifier; and
invalidating the user authentication password after expiration of a validity period;
wherein generating a first device identifier using the user authentication password comprises
after splicing the terminal device information and the user authentication password in a preset sequence, processing the spliced information using a Secure Hash Algorithm to obtain a first device identifier.

2. The method according to claim 1, wherein the first request is sent by a terminal device or a user terminal; and the prior request is sent by the terminal device or the user terminal.

3. The method according to claim 2, further comprising:
sending the first device identifier to the terminal device and/or the user terminal.

4. The method according to claim 1, further comprising:
saving a binding relation between user's identity information and the first device identifier.

5. The method according to claim 4, further comprising:
receiving a cancelation request carrying the first device identifier; and
deleting the binding relation between the user's identity information and the first device identifier.

6. The method according to claim 4, further comprising:
receiving a data request comprising a first device identifier, judging whether, locally, there is user's identity information having a binding relation with the first device identifier, if, locally, there is user's identity information having a binding relation with the first device identifier, forwarding the data request to the user terminal corresponding to the user's identity information, if, locally, there is no user's identity information having a binding relation with the first device identifier, rejecting the data request; or,
receiving a data request comprising user's identity information, judging whether, locally, there is a first device identifier having a binding relation with the user's identity information, and if, locally, there is a first device identifier having a binding relation with the user's identity information, forwarding the data request to the terminal device corresponding to the first device identifier, if, locally, there is not a first device identifier having a binding relation with the user's identity information, rejecting the data request.

7. The method according to claim 1, wherein the user authentication password is generated by:
receiving the prior request;

determining user's identity information, and generating a user authentication password using the user's identity information; and saving the user authentication password corresponding to the user's identity information.

8. The method according to claim 7, wherein generating a user authentication password using the user's identity information comprises:

after splicing the user's identity information and random information in a preset sequence, encrypting the spliced information to obtain a user authentication password.

9. The method according to claim 1, wherein if the received first request does not comprise a user authentication password, the method further comprises:

generating a second device identifier using the terminal device information included in the received first request.

10. The method according to claim 9, further comprising:

returning the generated second device identifier to the terminal device and/or user terminal.

11. The method according to claim 1, wherein the terminal device information comprises at least one of a device model, a device MAC address, and a product serial number of a device.

12. The method according to claim 1, further comprising:

receiving a login request;

judging whether the first device identifier included in the login request is released; and granting the login request in response to whether the first device identifier included in the login request is released.

13. The method according to claim 1, further comprising:

receiving a cancelation request carrying the first device identifier; and releasing the first device identifier.

14. The method according to claim 1, wherein before generating a first device identifier corresponding to the terminal device using the user authentication password, the method further comprises:

judging whether the user authentication password included in the first request exceeds a validity period;

if the user authentication password included in the first request exceeds the validity period, returning a registration failure response;

if the user authentication password included in the first request does not exceed the validity period, performing a step of generating a first device identifier corresponding to the terminal device using the user authentication password.

15. The method according to claim 1, wherein the first request comprises an identity registration request; and the prior request comprises a request for acquiring an authentication password.

16. A method of allocating device identifiers, comprising:

acquiring a user authentication password from a server; and sending the user authentication password to a terminal device to trigger the terminal device to acquire a first device identifier corresponding to the terminal device from the server by using the user authentication password and terminal device information, and causing the server to subsequently invalidate the user authentication password after expiration of a validity period, the first device identifier being generated at the server, and acquiring the first device identifier being based on user identity information and the first device identifier having been bound at the server;

wherein the first device identifier is generated using the user authentication password by after splicing the terminal device information and the user authentication password in a preset sequence, processing the spliced information using a Secure Hash Algorithm to obtain the first device identifier.

17. The method according to claim 16, further comprising:

receiving the first device identifier returned by the terminal device.

18. The method according to claim 16, wherein acquiring a user authentication password from a server comprises:

sending a request for acquiring an authentication password to the server; and receiving a user authentication password generated by the server using the user's identity information and returned by the server.

19. A method of allocating device identifiers, comprising:

receiving a user authentication password from a user terminal;

sending a first request comprising terminal device information and the user authentication password to a server, causing the server to subsequently invalidate the user authentication password after expiration of a validity period; and receiving and saving the first device identifier returned by the server, the first device identifier being generated at the server and receiving the first device identifier being based on user identity information and the first device identifier having been bound at the server;

wherein the first device identifier is generated using the user authentication password by after splicing the terminal device information and the user authentication password in a preset sequence, processing the spliced information using a Secure Hash Algorithm to obtain the first device identifier.

* * * * *